(12) United States Patent
Thacker et al.

(10) Patent No.: US 9,633,521 B2
(45) Date of Patent: Apr. 25, 2017

(54) GAMING SYSTEM WITH PRIZE AWARD BASED ON CURRENT AND PREVIOUS GAME PLAY OUTCOMES

(75) Inventors: Christopher John Thacker, Earlysville, VA (US); Daniel William Milligan, Palmyra, VA (US)

(73) Assignee: Video Gaming Technologies, Inc., Franklin, TN (US)

( * ) Notice: Subject to any disclaimer, the term of this patent is extended or adjusted under 35 U.S.C. 154(b) by 398 days.

(21) Appl. No.: 13/545,583

(22) Filed: Jul. 10, 2012

(65) Prior Publication Data

US 2014/0018145 A1    Jan. 16, 2014

(51) Int. Cl.
*G07F 17/32* (2006.01)
*A63F 13/26* (2014.01)

(52) U.S. Cl.
CPC ...... *G07F 17/3293* (2013.01); *G07F 17/3262* (2013.01); *G07F 17/3279* (2013.01); *A63F 13/26* (2014.09); *G07F 17/3258* (2013.01)

(58) Field of Classification Search
CPC ............ G07F 17/3262; G07F 17/3258; G07F 17/3279; G07F 17/3293; A63F 13/00; A63F 13/26
USPC ................................. 463/16–20, 25
See application file for complete search history.

(56) References Cited

U.S. PATENT DOCUMENTS

| | | | |
|---|---|---|---|
| 5,848,936 A | 12/1998 | Morrison | |
| 6,311,976 B1 * | 11/2001 | Yoseloff et al. | 273/138.2 |
| 6,322,451 B1 | 11/2001 | Miura | |
| 6,626,761 B1 | 9/2003 | Okada | |
| 6,857,958 B2 | 2/2005 | Osawa | |
| 7,744,453 B2 | 6/2010 | Pacey | |
| 2004/0053657 A1 | 3/2004 | Fiden et al. | |
| 2004/0116175 A1 | 6/2004 | Aida | |
| 2005/0096121 A1 * | 5/2005 | Gilliland | G07F 17/32 463/20 |
| 2005/0282607 A1 * | 12/2005 | Gauselmann | G07F 17/32 463/16 |
| 2006/0003838 A1 | 1/2006 | Kobayashi et al. | |
| 2006/0121972 A1 * | 6/2006 | Walker | G07F 17/32 463/16 |
| 2007/0149274 A1 | 6/2007 | Kobayashi | |
| 2007/0213114 A1 * | 9/2007 | Caspers et al. | 463/16 |
| 2007/0238511 A1 | 10/2007 | Sato | |
| 2007/0238512 A1 * | 10/2007 | Sato | 463/20 |
| 2008/0188285 A1 | 8/2008 | Roelofs | |
| 2008/0248849 A1 * | 10/2008 | Lutnick et al. | 463/16 |
| 2010/0222130 A1 | 9/2010 | Pacey | |

* cited by examiner

*Primary Examiner* — Jasson Yoo

(74) *Attorney, Agent, or Firm* — Armstrong Teasdale LLP

(57) ABSTRACT

A game of chance associated with a first player is executed at least in part by selecting a combination of game symbols from a set of available game symbols. A history of previous game symbol combinations selected by one or more previous executions of a game of chance is determined. The previous executions are associated with a second player and/or a previous gaming session associated with the first player. When the selected game symbol combination is included in the history of previous game symbol combinations, a prize is awarded.

20 Claims, 4 Drawing Sheets

GAMING SYSTEM WITH PRIZE AWARD BASED ON CURRENT AND PREVIOUS GAME PLAY OUTCOMES

BACKGROUND OF THE INVENTION

The embodiments described herein relate generally to gaming systems and, more particularly, to systems and methods for awarding prizes based on matching of current and previous game play outcomes.

At least some known gaming systems award a secondary prize (e.g., a bonus) based on a predetermined condition. For example, a gaming system may award a bonus when a game play results in a predetermined pattern of symbols, such as a randomly selected set of reel symbols. However, such systems do not provide prizes based on matching game play outcomes to previous game play outcomes by other players or previous game play outcomes by the same player across multiple game play sessions.

BRIEF DESCRIPTION OF THE INVENTION

In one aspect, one or more non-transitory computer-readable storage media are provided. The computer-readable storage media have embodied thereon computer-executable instructions. When executed by a computing device, the computer-executable instructions cause the computing device to execute, by the computing device, a game of chance associated with a first player at least in part by selecting a combination of game symbols from a set of available game symbols. The computer-executable instructions also cause the computing device to determine, by the computing device, whether the selected game symbol combination is included in a history of previous game symbol combinations selected by one or more previous executions of a game of chance associated with a second player, and to award, by the computing device, a prize when the selected game symbol combination is included in the history of previous game symbol combinations.

In another aspect, a gaming system is provided. The gaming system includes at least one gaming machine and a gaming server coupled to the at least one gaming device via a network. The at least one gaming machine includes a display device configured to display to a first player a game symbol combination selected by execution a game of chance associated with the first player. The gaming server is configured to, determine a history of previous game symbol combinations selected by one or more previous executions of a game of chance. The previous executions are associated with a second player and/or a previous gaming session associated with the first player. The gaming server is also configured to determine whether the selected game symbol combination is included in the history of previous game symbol combinations, and to award a prize when the selected game symbol combination is included in the history of previous game symbol combinations.

In yet another aspect, a method for use with a gaming system having a gaming server is provided. The method includes executing a game of chance associated with a first player at least in part by selecting a combination of game symbols from a set of available game symbols and determining, by the gaming server, a history of previous game symbol combinations selected by one or more previous executions of a game of chance. The previous executions are associated with a second player and/or a previous gaming session associated with the first player. The gaming server determines whether the selected game symbol combination is included in the history of previous game symbol combinations and awards a prize when the selected game symbol combination is included in the history of previous game symbol combinations.

DETAILED DESCRIPTION OF THE INVENTION

Exemplary embodiments of systems and methods for use in awarding prizes, such as bonuses, based on matches between a current game play outcome (e.g., game symbol combination) and one or more previous game play outcomes. For example, a symbol combination selected for a player may be compared to another player's previous symbol combinations, and/or to the same player's previous symbol combinations (e.g., from previous gaming sessions). When a match between the current and previous symbol combinations is found, a prize (e.g., a bonus) may be awarded to the player.

Exemplary technical effects of systems and methods described herein include at least one of: (a) executing a game of chance associated with a first player at least in part by selecting a combination of game symbols from a set of available game symbols; (b) determining, by a gaming server, a history of previous game symbol combinations selected by one or more previous executions of a game of chance, wherein the previous executions are associated with one or more of the following: a second player, and a previous gaming session associated with the first player; (c) determining, by the gaming server, whether the selected game symbol combination is included in the history of previous game symbol combinations; and (d) awarding, by the gaming server, a prize when the selected game symbol combination is included in the history of previous game symbol combinations.

Figure 1:
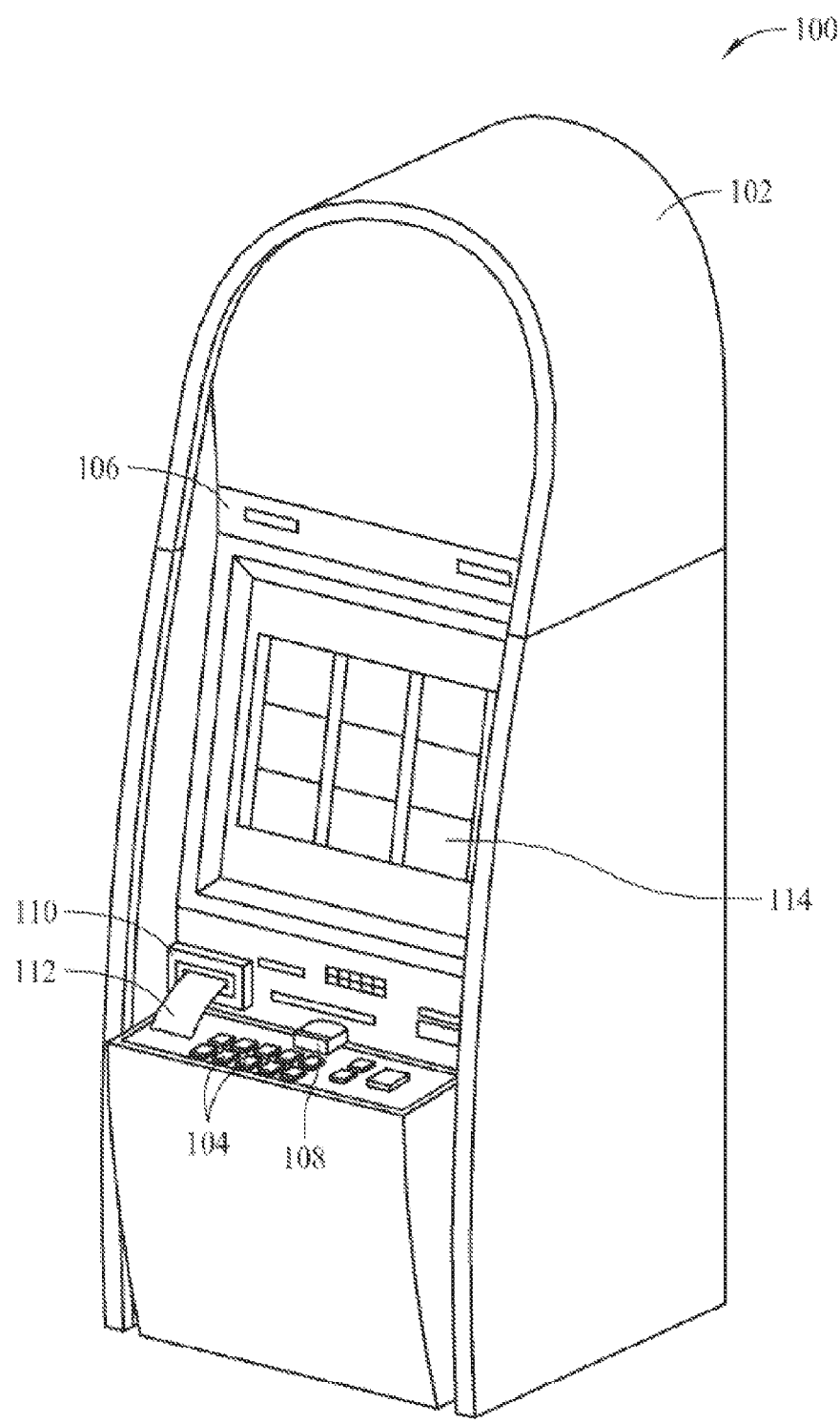
FIG. 1 is a schematic diagram of an exemplary gaming machine.

FIG. 1 is a schematic diagram of an exemplary gaming machine 100 that enables a player to play one or more games of chance. Gaming machine 100 may be any type of gaming machine, and may include, without limitation, different structures than those shown in FIG. 1. Moreover, gaming machine 100 may employ different methods of operation than those described below.

In the exemplary embodiment, gaming machine 100 includes a cabinet 102 configured to house a plurality of components, such as a gaming machine controller, peripheral devices, display devices, and player interaction devices. For example, in an exemplary embodiment, gaming machine 100 includes a plurality of switches and/or buttons 104 that are coupled to a front 106 of cabinet 102. Buttons 104 may be used to start play of a primary or secondary game. One button 104 may be a "Bet One" button that enables the player to place a bet or to increase a bet. Another button 104 may be a "Bet Max" button that enables the player to bet a maximum permitted wager. Yet another button 104 may be a "Cash Out" button that enables the player to receive a cash payment or other suitable form of payment, such as a ticket or voucher, which corresponds to a number of remaining credits.

In the exemplary embodiment, gaming machine 100 also includes a coin acceptor 108 for accepting coins and/or tokens, and a bill acceptor 110 for accepting and/or validating cash bills, coupons, and/or ticket vouchers 112. Bill acceptor 110 may also be capable of printing tickets 112 as is described in greater detail below. Furthermore, in some embodiments, bill acceptor 110 includes a card reader or validator for use with credit cards, debit cards, identification cards, and/or smart cards. The cards accepted by bill acceptor 110 may include a magnetic strip and/or a preprogrammed microchip that includes a player's identification, credit totals, and any other relevant information that may be used. Moreover, in the exemplary embodiment, gaming machine 100 includes one or more display devices 114. Display devices 114 are mounted to cabinet 102, and may include a primary display device for displaying a primary game and a secondary display device for displaying a secondary or bonus game. Display devices 114 may include, without limitation, a plasma display, a liquid crystal display (LCD), and/or a display based on light emitting diodes (LEDs), organic light emitting diodes (OLEDs), polymer light emitting diodes (PLEDs), and/or surface-conduction electron emitters (SEDs). In an exemplary embodiment, display device 114 is used to display one or more game image, symbols and indicia such as a visual representation or exhibition of movement of an object such as a mechanical, virtual, or video reel, dynamic lighting, video images, and the like. In an alternative embodiment, display device 114 displays images and indicia using mechanical means. For example, display device 114 may include a physical or simulated electromechanical device, such as one or more rotatable reels, to display a plurality of game or other suitable images, symbols, or indicia.

In one embodiment, gaming machine 100 randomly generates game outcomes using probability data. For example, each game outcome is associated with one or more probability values that are used by gaming machine 100 to determine the game output to be displayed. Such a random calculation may be provided by a random number generator, such as a true random number generator, a pseudo-random number generator, or any other suitable randomization process.

Figure 2:
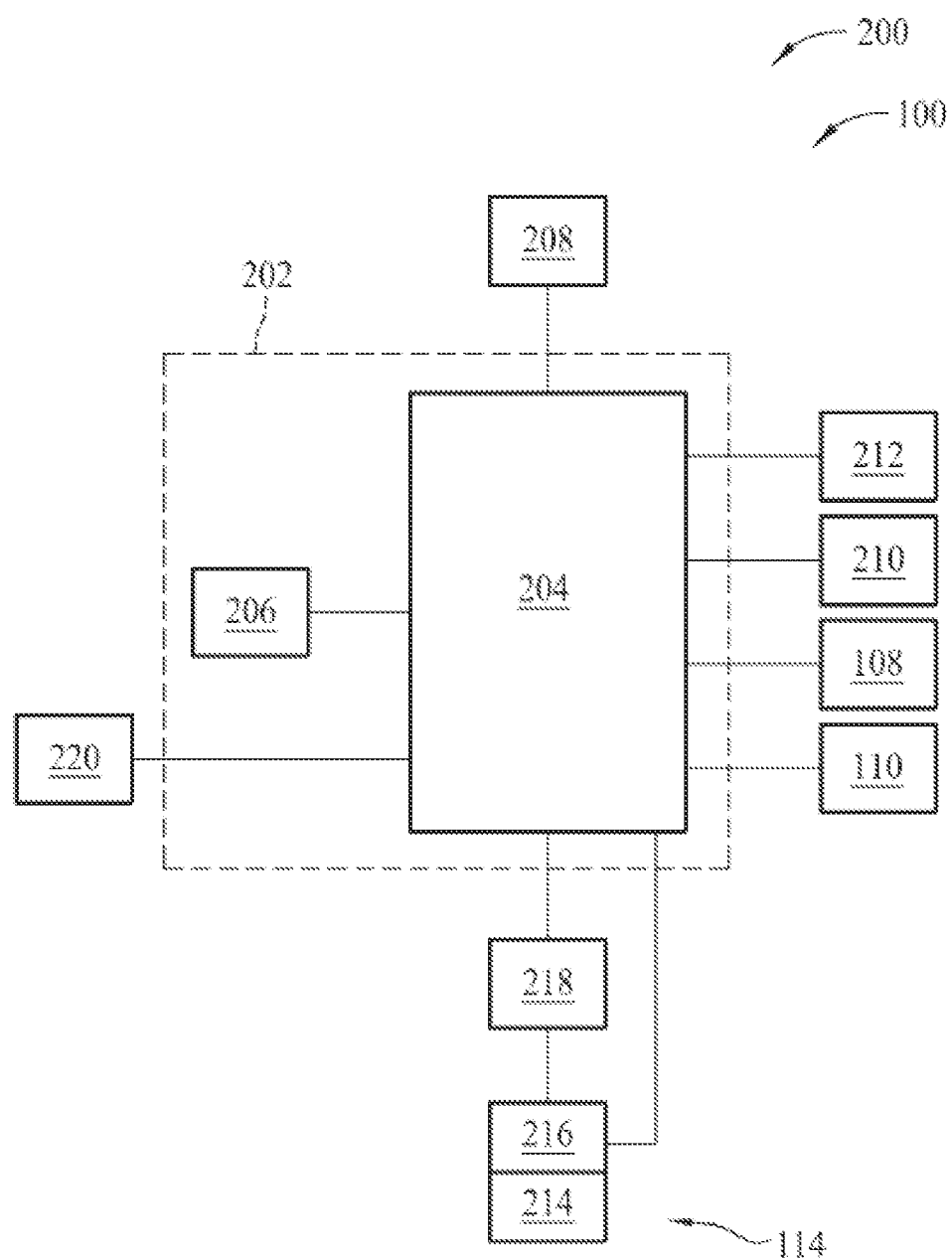
FIG. 2 is a schematic block diagram of an exemplary electrical architecture that may be used with the gaming machine shown in FIG. 1.

FIG. 2 is a schematic block diagram of an exemplary electrical architecture 200 that may be used with gaming machine 100. In the exemplary embodiment, gaming machine 100 includes a gaming machine controller 202 having a processor 204 communicatively coupled a memory area 206. Moreover, in the exemplary embodiment, processor 204 and memory area 206 reside within cabinet 102 (shown in FIG. 1) and may be collectively referred to herein as a "computer" or "controller."Controller 202 communicates with one or more other gaming machines 100 or other suitable devices via a network interface 208. Processor 204 may be a microprocessor, a microcontroller-based platform, a suitable integrated circuit, and/or one or more application-specific integrated circuits (ASICs). However, the above examples are exemplary only, and thus are not intended to limit in any way the definition and/or meaning of the term "processor."

Memory area 206 stores program code and instructions, executable by processor 204, for controlling gaming machine 100. For example, memory area 206 stores data such as image data, event data, player input data, random or pseudo-random number generation software, paytable data, and/or other information or applicable game rules that relate to game play on gaming machine 100. Moreover, memory area 206 may include one or more forms of memory. For example, memory area 206 can include random access memory (RAM), read-only memory (ROM), flash memory, and/or electrically erasable programmable read-only memory (EEPROM). In some embodiments, other suitable magnetic, optical, and/or semiconductor-based memory may be included in memory area 206 by itself or in combination.

In the exemplary embodiment, gaming machine 100 includes a credit display 210, which displays a player's current number of credits, cash, account balance or the equivalent. Gaming machine 100 also includes a bet display 212 which displays a player's amount wagered. Credit display 210 and bet display 212 may be standalone displays independent of display device 114, or credit display 210 and bet display 212 may be incorporated into display device 114.

Moreover, in an exemplary embodiment, display device 114 is controlled by controller 202. In some embodiments, display device 114 includes a touch screen 214 and an associated touch screen controller 216. A video controller 218 is communicatively coupled to controller 202 and touch screen controller 216 to enable a player to input game play decisions into gaming machine 100 via touch screen 214. Furthermore, gaming machine 100 includes one or more communication ports 220 that enable controller 202 to communicate with external peripheral devices (not shown) such as, but not limited to, external video sources, expansion buses, game or other displays, a SCSI port, or a key pad.

Figure 3:
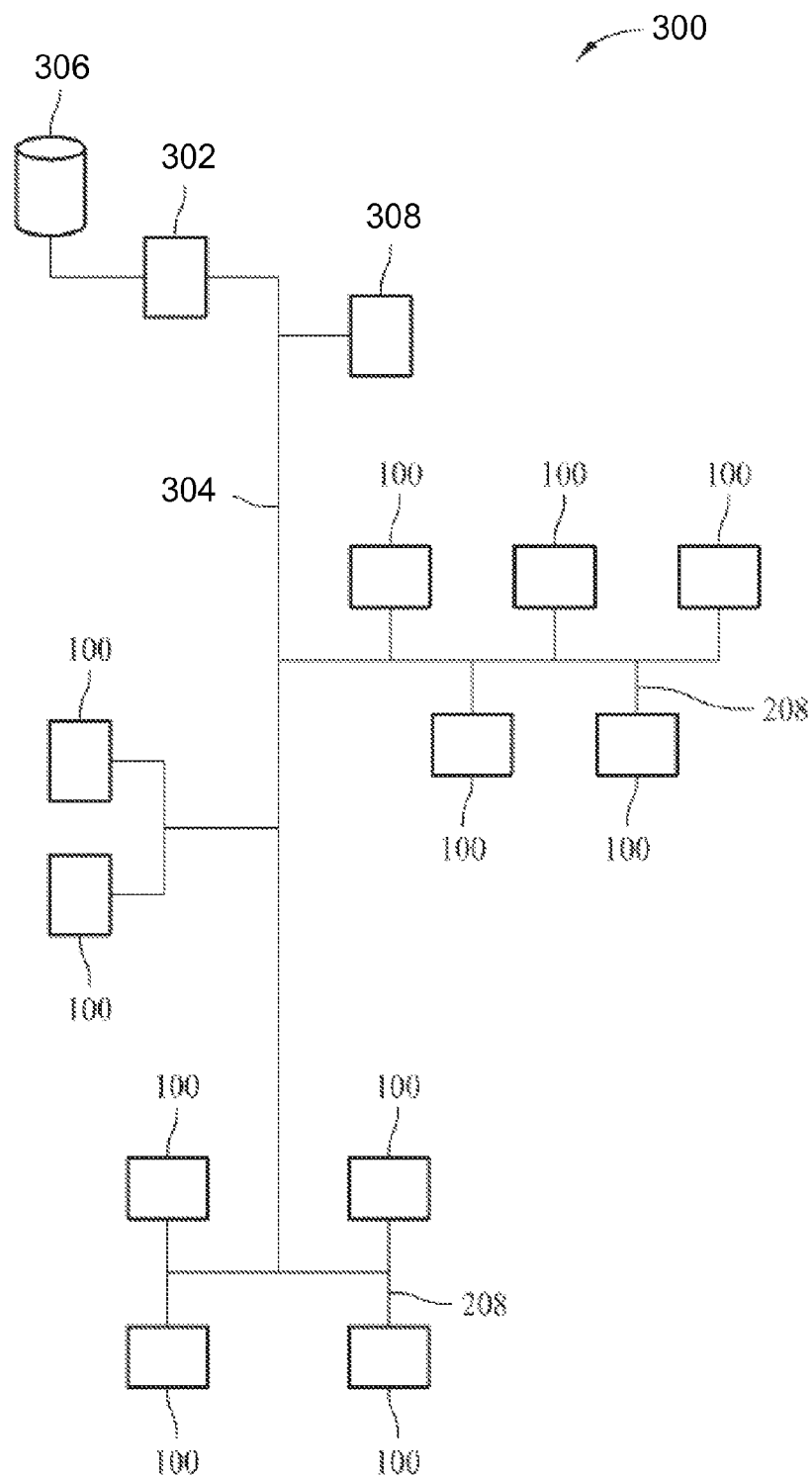
FIG. 3 is a block schematic diagram of an exemplary gaming system that includes a plurality of gaming machines shown in FIG. 1.

FIG. 3 is a block schematic diagram of an exemplary gaming system 300 that includes a plurality of gaming machines 100. Each gaming machine 100 is coupled via network interface 208 to one or more servers, such as a gaming server 302, using a network 304. Gaming server 302 includes a processor (not shown) that facilitates data communication between each gaming machine 100 and other components of gaming system 300. Such data is stored in, for example, a memory area 306, such as a database, that is coupled to gaming server 302.

As described above, gaming machines 100 may include video bingo machines, video poker machines, video slot machines, and/or other similar gaming machines that implement alternative games. Moreover, gaming machines 100 may be terminal-based machines, wherein the actual games, including random number generation and/or outcome determination, are performed at gaming server 302. In such an embodiment, gaming machine 100 displays results of the game (e.g., game symbol combinations and/or prizes) via display device 114 (shown in FIGS. 1 and 2).

Moreover, in the exemplary embodiment, gaming system 300 includes a configuration workstation 308 that includes a user interface that enables an administrator to set up and/or to modify portions of gaming system 300 and/or gaming server 302. Gaming server 302 may perform a plurality of functions including, for example, game outcome generation, player tracking functions, and/or accounting functions. However, in alternative embodiments, gaming system 300 may include a plurality of servers that separately perform these functions and/or any suitable function for use in a network-based gaming system. In the exemplary embodiment, gaming server 302 controls bonus applications or bonus systems that award bonus opportunities on gaming system 300. Moreover, gaming server 302 includes a set of rules for awarding jackpots in excess of those established by winning pay tables (not shown) of each gaming machine 100. Some bonus awards may be awarded randomly, while other bonus awards may be made to groups of gaming machines 100 operating in a progressive jackpot mode.

Moreover, in some embodiments, gaming server 302 tracks data of players using gaming machines 100, and also controls messages that appear on display device 114 of gaming machines 100. For example, gaming server 302 can store physical characteristics of players, such as, but not limited to, the player age. Gaming server 302 can also store data related to the players and tracked using player tracking identification, such as a player card. Moreover, gaming server 302 can store information and data about the player such as loyalty points, player address, phone number, and/or any information that may be retrieved and transmitted to gaming machines 100. In some embodiments, gaming server 302 stores and tracks information such as, but not limited to, the average amount of wager played at gaming machine 100. Moreover, gaming server 302 can track an average amount of wagers by the player, any funds the player may have in an account, and data relating to reportable events. Such data is associated with individual players and logged using a taxable accrual log.

Furthermore, and in the exemplary embodiment, gaming server 302 is configured to award prizes based on current and previous game symbol combinations. For example, as described in additional detail below, gaming server 302 may compare a selected game symbol combination for a current game associated with a player to a history of one or more previous game symbol combinations that are associated with the same player or one or more other players. Further such previous game symbol combinations may be selected from current or previous gaming sessions.

Figure 4:
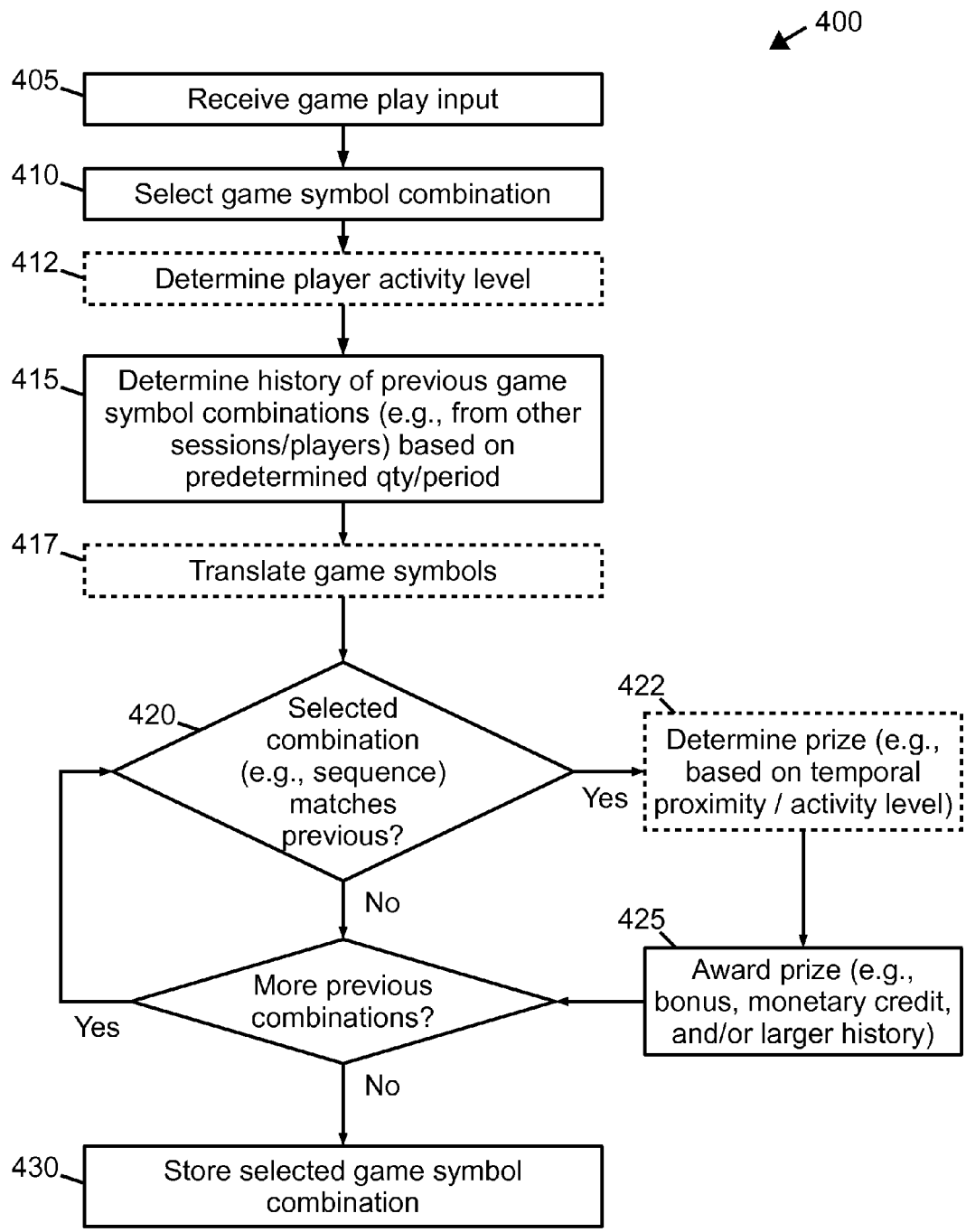
FIG. 4 is a flowchart that illustrates an exemplary method for awarding a prize based on current and previous game symbol combinations using the gaming system shown in FIG. 3.

FIG. 4 is a flowchart 400 that illustrates an exemplary method for awarding a prize based on current and previous game symbol combinations using gaming system 300 (shown in FIG. 3). Referring to FIGS. 3 and 4, although operations are described below with respect to particular computing devices, such as gaming machine 100 and gaming server 302, embodiments described enable such operations to be performed by any computing device.

In exemplary embodiments, a game of chance is executed at least in part by receiving 405 game play input (e.g., a game selection and/or a button press) from a first player at a gaming machine 100 and selecting 410, by gaming machine 100 and/or gaming server 302, a game symbol combination from a set of available game symbols based on the received game play input. (In embodiments where gaming server 302 performs the selection 410, the game play input may be provided to gaming server 302 by gaming machine 100 via network 304.) For example, the set of available game symbols may include reel stops (e.g., cherries, bars, etc.), playing cards, die faces (e.g., numeric values one through six), and/or any other symbols that may be used in a game of chance. Further, gaming symbols may be selected 410 randomly from the set of available symbols, or symbols within the set may be associated with varying selection weight values, such that a symbol associated with a relatively higher weight value is more likely to be selected than a symbol associated with a relatively lower weight value.

Gaming server 302 determines 415 a history of previous game symbol combinations that have been selected 410 by one or more previous executions of a game of chance. The previous executions are associated with the current gaming session, with one or more players other than the first player (e.g., a second player), and/or with a previous gaming session associated with the first player. A gaming session may include, for example, game executions performed for a player in which the time between game executions does not exceed a predetermined timeout value and/or game executions performed while a player is logged in to (e.g., using a player tracking device) gaming machine 100 and/or gaming server 302.

Gaming server 302 may determine 415 the history of previous game symbol combinations by, for example, selecting a predetermined quantity of previous game symbol combinations (e.g., those most recently selected 410). The resulting set of previous game symbol combinations may be understood as a queue of game symbol combinations, with the quantity of combinations selected defining the queue size. In addition, or alternatively, gaming server 302 may determine 415 the history by selecting previous game symbol combinations corresponding to (e.g., selected 410 during) a predetermined period of time. For example, the period of time may be defined as a duration prior to the current time. In some embodiments, the history is based on both a queue size and a period of time. For example, the previous game symbol combinations in the history may be limited by both a maximum quantity (queue size) and a time period. When a previous game symbol combination is no longer within the time period, the previous game symbol combination is removed from the queue. Such a time period may be referred to as a "decay time."

In some embodiments, a player is associated with a player activity level representing a frequency of game play by the player. In such an embodiment, gaming server 302 may determine 412 the activity level of the first player (e.g., by retrieving the activity level from memory area 306) and determine 415 the history of previous symbol combinations at least in part based on the activity level of the player. For example, the queue size and/or time period may be determined (e.g., calculated or selected from a lookup table) based on the activity level.

Some embodiments enable the first player to determine which players' previous game symbol combinations are included in the history. For example, the player may elect to create the history based on game executions associated with other players in a predetermined group (e.g., a circle of friends), game executions associated with other players at a group of gaming machines 100 (e.g., collocated with the gaming machine 100 used by the first player), and/or any other combination of game executions usable with the methods described herein.

Gaming server 302 determines whether the selected game symbol combination is included in the history of previous game symbol combinations by comparing 420 the selected game symbol combination to each previous game symbol combination in the history. In some embodiments, gaming server compares 420 the selected and previous game symbol combinations by comparing a sequence of game symbols represented by the selected game symbol combination to a sequence of game symbols represented by the previous game symbol combination.

When the selected game symbol combination is included in the history of previous game symbol combinations, gaming server 302 awards 425 a prize to the first player. In exemplary embodiments, the prize awarded 425 includes a game play bonus, such as one or more free game executions, an upgraded activity level, and/or an upgraded paytable for use in the game being played by the first player or another game. In addition, or alternatively, the prize awarded 425 may include a monetary credit, a longer history (e.g., greater queue size and/or time period) for use in a subsequent determination 415 of previous symbol combinations, and/or a coupon for goods and/or services.

Further, in some embodiments, gaming server 302 selects 422 the prize to be awarded 425 to the first player. As one example, the prize may be selected 422 based on the temporal proximity of the selected game symbol combination to a matching previous game symbol combination within the history, such that a match with relatively high temporal proximity (e.g., relatively little time) between symbol combinations yields a more valuable prize than a match with relatively low temporal proximity (e.g., relatively greater time).

In exemplary embodiments, regardless of whether a prize was awarded 425 to the first player, gaming server 302 stores 430 (e.g., in memory area 306) the selected game symbol combination in association with the first player, such that the game symbol combination selected 410 in the current game execution is available for use in subsequently determining 415 a history of previous game symbol combinations for the first player and/or other players. Gaming server 302 may also store 430 other game play data, such as the time at which the game was executed to facilitate subsequently determining 415 a history of previous game symbols. Although storage 430 of the selected game symbol combination is shown after comparison 420 of game symbol combinations in FIG. 4, the selected game symbol combination may be stored 430 at any time after selection 410. Further, some embodiments enable a player to select whether the game symbol combination selected 410 should be stored 430 and, therefore, available for future use as a previous game symbol combination. In such embodiments, gaming server 302 may store 430 the selected game symbol combination based on user input indicating that the selected game symbol combination should be stored.

In some embodiments, the history of previous game symbol combinations is determined 415 based at least in part on game play outcome, game play input, and/or other aspects of game play. As one example, the history may include only game symbol combinations representing winning outcomes (e.g., associated with an award of a prize) or non-winning outcomes. As another example, the history may include only game symbol combinations selected 410 after receiving 405 a wager amount above a predetermined threshold (e.g., a maximum wager amount or a percentage of a maximum wager amount) and/or game symbol combinations selected 410 during one or more predetermined periods of time.

In some embodiments, the history is determined 415 based on one type of game play, and a prize is awarded 425 based on game play input received 405 in another type of game play. Types of game play may include, for example, for-pay game play capable of providing a monetary prize (e.g., operated by a gaming facility, such as a casino) and free game play that does not provide a monetary prize (e.g., a web browser-based game and/or a smart phone game). As one example, gaming machine 100 may be configured to provide monetary prizes, and gaming server 302 may be configured to determine 415 the history of previous game symbol combinations based at least in part on previous executions of a free game of chance. As another example, gaming machine 100 may be configured to display a free game of chance that does not provide monetary prizes, and gaming server 302 may be configured to determine 415 the history of previous game symbol combinations based at least in part on previous executions of a for-pay game of chance that does provide monetary prizes.

Some embodiments enable a team of players to compete against one or more other teams in a tournament style game. For example, in some embodiments, each player is a member of a team, and gaming server 302 awards 425 a prize (e.g., a point, or a quantity of points determined 422 by gaming server 302) to the team of which the current player is a member. Gaming server 302 selects the team with the greatest quantity of points at the end of a predetermined period of time, or the first team to reach a target quantity of points, as the winner of the tournament. The winning team and/or the members of the winning team may be awarded 425 a tournament prize.

The techniques described herein may be applied to allow matching of game symbol combinations even when the currently selected and previous game symbol combinations are based on different symbol sets. For example, the game symbol combination may be selected 410 from a first set of available game symbols (e.g., reel stops), and at least one of the previous game symbol combinations in the history may be associated with (e.g., have been selected 410 from) a second set of game symbols.

In exemplary embodiments, when the selected and previous game symbol combinations are associated with different sets of available game symbols, gaming server 302 translates 417 the game symbols within the selected game symbol combination and/or within the previous game symbol combination prior to comparison 420. For example, gaming server 302 may translate the selected game symbol combination or the previous game symbol combination based on a mapping between the first set of available game symbols and the second set of available game symbols, and compare 420 the game symbol combinations based on the translation 417.

In some embodiments, a third set of game play symbols, which may be referred to as a "universal" set, is defined. In such embodiments, gaming server 302 translates 417 the selected game symbol combination based on a mapping between the first set and third set of game symbols to create a translated selected game symbol combination, and translates 417 the previous game symbol combination based on a mapping between the second set and third set of game symbols to create a translated previous game symbol combination. Gaming server 302 then compares 420 the translated selected game symbol combination to the translated previous symbol combination.

Exemplary embodiments of systems and methods for providing prizes (e.g., bonuses) based on current and previous game play are described above in detail. The systems and methods are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

A computer, controller, or server, such as those described herein, includes at least one processor or processing unit and a system memory. The computer, controller, or server typically has at least some form of computer-readable storage media. By way of example and not limitation, computer-readable media include computer-readable storage media and communication media. Computer-readable storage media include removable and non-removable devices implemented in any method or technology for storage of information such as computer-readable instructions, data structures, program modules, or other data.

Although the present invention is described in connection with an exemplary gaming system environment, embodiments of the invention are operational with numerous other general purpose or special purpose gaming system environments or configurations. The gaming system environment is not intended to suggest any limitation as to the scope of use or functionality of any aspect of the invention. Moreover, the gaming system environment should not be interpreted as having any dependency or requirement relating to any one or combination of components illustrated in the exemplary operating environment.

Embodiments of the invention may be described in the general context of computer-executable instructions, such as program components or modules, executed by one or more computers or other devices. Aspects of the invention may be implemented with any number and organization of components or modules. For example, aspects of the invention are not limited to the specific computer-executable instructions or the specific components or modules illustrated in the figures and described herein. Alternative embodiments of the invention may include different computer-executable instructions or components having more or less functionality than illustrated and described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, the term "database" refers generally to any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. One or more non-transitory computer-readable storage media having embodied thereon computer-executable instructions, wherein when executed by a computing device comprising a processor device and a memory device and communicatively coupled to a gaming machine including a display device, an accepting device configured to accept a physical item associated with a monetary value that establishes a credit balance that is being increasable and decreasable based at least on wagering activity, and a cashout device configured to receive an input to cause an initiation of a payout associated with the credit balance, the computer-executable instructions cause the computing device to:

select, by the computing device, a current game symbol combination from a current gaming session including at least one current gaming outcome, wherein the current gaming session includes accepting the physical item via the accepting device, and wherein the current gaming symbol combination corresponds to a first game symbol set identify, by the gaming server, a previous game symbol combination from a plurality of previous game symbol combinations selected in one or more previous gaming sessions including at least one previous gaming outcome, wherein the previous game symbol combination is selected from a second game symbol set, and wherein the current gaming session and the one or more previous gaming sessions are associated with one or more games of chance;

generate a translated current game symbol combination, including translating each symbol in the current game symbol combination into a corresponding symbol in a universal game symbol set using a first mapping between the first game symbol set and the universal symbol set;

generate a translated previous game symbol combination, including translating each symbol in the previous game symbol combination into a corresponding symbol in the universal game symbol set using a second mapping between the second game symbol set and the universal symbol set; and award, using the cashout device, a prize based on a match between the translated previous game symbol combination and the translated current game symbol combination.

2. One or more computer-readable storage media in accordance with claim 1, wherein the computer-executable instructions cause the computing device to compare the translated current game symbol combination to the translated previous game symbol combination in the universal game symbol set.

3. One or more computer-readable storage media in accordance with claim 1, wherein the plurality of previous game symbol combinations includes a predetermined quantity of previous game symbol combinations.

4. One or more computer-readable storage media in accordance with claim 1, wherein the plurality of previous game symbol combinations includes previous game symbol combinations selected from a predetermined period of time.

5. One or more computer-readable storage media in accordance with claim 1, wherein the universal game symbol set is different from both the first game symbol set and the second game symbol set.

6. One or more computer-readable storage media in accordance with claim 1, wherein the computer-executable instructions further cause the computing device to compute the prize awarded based on a temporal proximity of the current game symbol combination to the previous game symbol combination.

7. One or more computer-readable storage media in accordance with claim 1, wherein the first player is associated with a player activity level representing a frequency of game play by the player, and wherein the computer-executable instructions further cause the computing device to determine, based on the player activity level, one or more of the following: a quantity of previous game symbol combinations in the plurality of previous game symbol combinations, and a period from which previous game symbol combination in the plurality are selected.

8. A gaming system comprising:
at least one gaming machine comprising an accepting device configured to accept an item associated with a monetary value that establishes a credit balance that is being increasable and decreasable based at least on wagering activity, a cashout device configured to receive an input to cause an initiation of a payout associated with the credit balance, and a display device configured to display to a first player a current game symbol combination selected from a first game symbol set by execution of a game of chance associated with the first player; and
a gaming server comprising a a processor device and a memory device, and coupled to said at least one gaming device via a network, said gaming server configured to:
select, by the at least one gaming machine, a current game symbol combination from a current gaming session including at least one current gaming outcome, wherein the current gaming session includes accepting the physical item via the accepting device, and wherein the current gaming symbol combination corresponds to a first game symbol set;
identify a previous game symbol combination from a plurality of previous game symbol combinations selected in one or more previous gaming sessions including at least one previous gaming outcome, wherein the previous game symbol combination is selected from a second game symbol set, and wherein the current gaming session and the one or more previous gaming sessions are associated with one or more games of chance;
generate a translated current game symbol combination, including translating each symbol in the current game symbol combination into a corresponding symbol in a universal game symbol set using a first mapping between the first game symbol set and the universal symbol set;
generate a translated previous game symbol combination, including translating each symbol in the previous game symbol combination into a corresponding symbol in the universal game symbol set using a second mapping between the second game symbol set and the universal symbol set; and
award, using the cashout device, a prize based on a match between the translated previous game symbol combination and the translated current game symbol combination.

9. A gaming system in accordance with claim 8, wherein said gaming machine is further configured to provide monetary prizes, and said gaming server is configured to determine the plurality of previous game symbol combinations based at least in part on previous executions of a free game of chance that does not provide monetary prizes.

10. A gaming system in accordance with claim 8, wherein said gaming machine is configured to display a free game of chance that does not provide monetary prizes, and said gaming server is configured to determine the plurality of previous game symbol combinations based at least in part on previous executions of a game of chance that provides monetary prizes.

11. A gaming system in accordance with claim 8, wherein said gaming server is configured to compare the current game symbol combination to the previous game symbol combination in the universal game symbol set.

12. A gaming system in accordance with claim 8, wherein said gaming server is configured to determine the plurality of previous game symbol combinations at least in part by selecting a predetermined quantity of previous game symbol combinations.

13. A gaming system in accordance with claim 8, wherein said gaming server is configured to determine the plurality of previous game symbol combinations at least in part by selecting previous game symbol combinations corresponding to a predetermined period of time.

14. A gaming system in accordance with claim 8, wherein the universal game symbol set is different from both the first game symbol set and the second game symbol set.

15. A gaming system in accordance with claim 8, wherein said gaming server is further configured to compute the prize awarded based on a temporal proximity of the current game symbol combination to the previous game symbol combination.

16. A method for use with a gaming system having a gaming server including processor and a database, the gaming server being communicatively coupled to a gaming machine including a display device, a gaming machine processor, a memory device, and an accepting device configured to accept an item associated with a monetary value that establishes a credit balance that is being increasable and decreasable based at least on wagering activity, and a cashout device configured to receive an input to cause an initiation of a payout associated with the credit balance, said method comprising:
selecting a current game symbol combination from a current gaming session including at least one current gaming outcome, wherein the current gaming session includes accepting the physical item via the accepting device, and wherein the current gaming symbol combination corresponds to a first game symbol set;
identifying, by the gaming server, a previous game symbol combination from a plurality of previous game symbol combinations selected in one or more previous gaming sessions including at least one previous gaming outcome, wherein the previous game symbol combination is selected from a second game symbol set, and wherein the current gaming session and the one or more previous gaming sessions are associated with one or more games of chance;
generating, by the gaming server, a translated current game symbol combination, including translating each symbol in the current game symbol combination into a corresponding symbol in a universal game symbol set using a first mapping between the first game symbol set and the universal symbol set;
generating, by the gaming server, a translated previous game symbol combination, including translating each symbol in the previous game symbol combination into a corresponding symbol in the universal game symbol set using a second mapping between the second game symbol set and the universal symbol set;

award, using the cashout device, a prize based on a match between the translated previous game symbol combination and the translated current game symbol combination.

17. A method in accordance with claim 16, wherein determining that the previous game symbol combination matches the current game symbol combination further comprises comparing the current game symbol combination to the previous game symbol combination in the universal game symbol set.

18. A method in accordance with claim 16, wherein determining the plurality of previous game symbol combinations comprises selecting a predetermined quantity of previous game symbol combinations.

19. A method in accordance with claim 16, wherein determining the plurality of previous game symbol combinations comprises selecting previous game symbol combinations corresponding to a predetermined period of time.

20. A method in accordance with claim 16, further comprising computing, by the gaming server, the prize awarded based on a temporal proximity of the current game symbol combination to the previous game symbol combination.

* * * * *